United States Patent [19]

Young

[11] Patent Number: 4,510,970
[45] Date of Patent: Apr. 16, 1985

[54] DUAL SEAL IN-LINE TEST VALVE

[75] Inventor: Terry G. Young, Longview, Tex.

[73] Assignee: Joy Manufacturing Company, Pittsburgh, Pa.

[21] Appl. No.: 456,900

[22] Filed: Jan. 10, 1983

[51] Int. Cl.³ .............................................. G01L 27/00
[52] U.S. Cl. ................................. 137/625.4; 73/4 R; 137/458; 137/625.49
[58] Field of Search ................. 137/625.4, 625.49, 458; 73/4 R

[56] References Cited

U.S. PATENT DOCUMENTS

| | | | |
|---|---|---|---|
| 3,049,148 | 8/1962 | Richardson | 73/4 R X |
| 3,817,282 | 6/1974 | Peters | 73/4 R X |
| 3,927,553 | 12/1975 | Frantz | 73/4 R |
| 3,987,817 | 10/1976 | Peters | 137/625.4 |

Primary Examiner—Robert G. Nilson
Attorney, Agent, or Firm—Marvin J. Marnock; David A. Warmbold

[57] ABSTRACT

A high pressure in-line test valve (42) is positioned to block off a first fluid pressure source (10) acting on a control valve means (32 and 34) and to provide communication with an alternate test fluid pressure source (138) for testing the control valve means. The test valve (42) has a central bore (70) in which a depressible piston (78) is positioned for longitudinal movement between a seated extended position (FIG. 2) blocking the first fluid pressure source and simultaneously communicating test fluid to the control valve means, and an unseated retracted position (FIG. 3) re-establishing communication between the first fluid pressure source and the control valve means and simultaneously blocking the alternate fluid pressure source (138) with a dual sealing means. The dual sealing means includes a primary metal-to-metal sealing member (84 and 114) and a secondary annular sealing member (120) providing a test valve that is capable of withstanding high working pressures such as 20,000 pounds per square inch without leaking fluid from the first fluid pressure source (110) to the alternate fluid passage (104) or externally of the test valve. The dual sealing means are releasable upon engagement of a hollow stinger (124) which actuates the piston (78) into its seated position and provides a connection means (134) to supply a test fluid from an alternate fluid pressure source (138) for testing of the control valve means (32 and 34).

4 Claims, 4 Drawing Figures

DUAL SEAL IN-LINE TEST VALVE

BACKGROUND OF THE INVENTION

This invention relates generally to valves and more particularly to a test valve arrangement for calibration of the opening limits of high and/or low pressure cut-off control valves.

Heretofore, similar test valves have been provided for communicating an alterante test fluid source with a valve means to be tested. For example, U.S. Pat. No. 3,817,282 to Peters issued on June 18, 1974 shows a test valve having a plunger mechanism which is operable to block the primary pressure source to allow an alternate test fluid to communicate from the alternate fluid passage into the valve means to be tested. A detachable stinger is utilized to actuate the plunger mechanism into blocking relationship with the primary pressure source as long as the stinger is inserted within the housing of the test valve. Once the stinger is removed, the plunger returns to its normal position allowing communication from the primary pressure source to the control valve and a spring loaded check valve operates to block the alternate fluid passage to fluid pressure from the primary pressure source. The employment of a separate check valve and plunger mechanism in such a test valve arrangement necessitates a relatively large number of elements and the test valve at times can be subject to malfunctioning.

Another example of such a test valve is shown in U.S. Pat. No. 3,987,817 to Peters issued on Oct. 26, 1976 wherein a test valve is disclosed that eliminates the necessity of the separate check valve element. This second patent to Peters is similar to the first in that the test valve utilizes a plunger mounted within a housing which is actuated into a seated position blocking the flow of fluid from a primary pressure source by a hollow stinger which is inserted within the central bore of the housing. The major differences arise in the manner of blocking the alternate fluid passage to fluid pressure from the primary pressure source. U.S. Pat. No. 3,987,817 utilizes a plunger that has an O-ring surrounding its circumference so that when the stinger is removed and the plunger returns to its normal unactuated position the O-ring contacts a restricted diameter portion within the central bore of the housing. The O-ring provides a seal between the plunger and housing thereby blocking the alternate fluid passage to fluid pressure from the primary pressure source. This design provides a general improvement over Peters' first patent due to its simplicity and decrease in number of valve parts, however, it is not applicable to all field service conditions. O-rings do not always provide adequate sealing characteristics, particularly when subjected to high pressure conditions such as in the range of 20,000 p.s.i.

Further, the above described test valves have open conduit end plugs which replace the stingers when the test valves are in their unactuated position. This provision allows pressurized fluid in the alternate fluid passage to escape to the outside atmosphere. Also, if the check valve or O-ring leak, then fluid from the primary pressure source vents to the outside atmosphere. In certain service conditions it is undesirable to allow fluids in the primary pressure source to come into contact with the outside atmosphere particularly where such fluid is flammable or harmful to man or the environment.

It is, accordingly, a general object of the invention to provide a high pressure in-line test valve which remains in position and normally communicates a first fluid pressure source with the control valve means to be tested, but which test valve is constructed and arranged so that communication between the first fluid pressure source and the valve means to be tested can be blocked off and to thereafter enable an alternate fluid pressure source externally of the test valve to be conducted to the valve means for testing thereof. Upon completion of the testing of the valve means, the test valve is constructed and arranged so that it blocks off communication between the alternate fluid pressure source and the valve means being tested with a dual sealing system so that no fluid is allowed to escape from the test valve to the outside atmosphere. The test valve further being constructed and arranged so that it will automatically reestablish communication between the first fluid pressure source and the control valves upon completion of testing.

Another object of the invention is to provide a high pressure in-line test valve that is capable of withstanding working pressures of 20,000 pounds per square inch without leaking fluid externally of the test valve.

Yet, another object of the invention is to provide a high pressure in-line test valve that utilizes an automatic dual sealing arrangement to block the alternate fluid passage from the working pressure existing in the first fluid pressure source to prevent any leakage of fluid through the alternate fluid passage to the exterior of the test valve.

Other objects, advantages and novel features of the invention will be apparent to those of ordinary skill in the art upon examination of the following description of a preferred embodiment of the invention and the accompanying drawings.

SUMMARY OF THE INVENTION

This invention is directed to a test valve arrangement capable of withstanding high working pressures without leaking flowline material to the outside atmosphere. The test valve employs a piston mounted within a housing which is held into position by a plug threadably received in the housing. A hollow stinger is inserted within the axial bore of the plug and moves the piston into a seated projected position blocking the flow of fluid from a primary or first fluid pressure source such as an oil pipe or wellhead. The housing bore has an enlarged diameter outer bore portion and a restricted diameter inner bore portion communicating into a valve chamber. A spring in the outer bore portion of the housing bore continuously urges the piston to a retracted position. The piston has an inner end portion and an outer end portion of a slightly larger diameter than the inner end portion, connected by an intermediate radial flange of an enlarged diameter. The radial flange fits closely within the outer bore of the housing and has a plurality of ports extending therethrough providing fluid communication from one side of the flange to the other. The piston has a valve element on the bottom of its inner end portion which fits closely within the restricted diameter portion of the housing. An annular sealing member is positioned about the circumference of the outer end portion of the piston adjacent its outer end. The plug limits the outward movement of the piston and receives the outer end portion of the piston within its axial bore. The plug has a bottom planar surface which has a circumferential groove formed therein intermediately between the axial bore and an outer perimeter of the plug. A plurality of conduits communicate between the groove and axial bore of the plug. When the piston and valve element thereon are in a retracted position, the radial flange of the piston contacts the bottom surface of the plug providing a metal-to-metal primary seal blocking fluid communication through the ports of the piston. In this position, the annular sealing member about the outer end portion of the piston is sealingly positioned within the axial bore of the plug outwardly of the conduits in the plug providing a secondary seal blocking fluid communication through the axial bore of the plug.

When the piston and valve element thereon are in a seated position, the radial flange of the piston is positioned within the outer bore of the housing and the annular sealing member about the outer end of the piston is positioned inwardly of the conduits of the plug and, thus, the primary and secondary sealing means are removed from sealing relation. In this position, the hollow stinger is connected to an alternate test fluid source and test fluid is allowed to communicate through the test valve into the fluid passage to control valves to be tested.

BRIEF DESCRIPTION OF THE DRAWINGS

In the accompanying drawings which form part of the specification and are to be read in conjunction therewith.

DESCRIPTION OF THE PREFERRED EMBODIMENT

Figure 1:
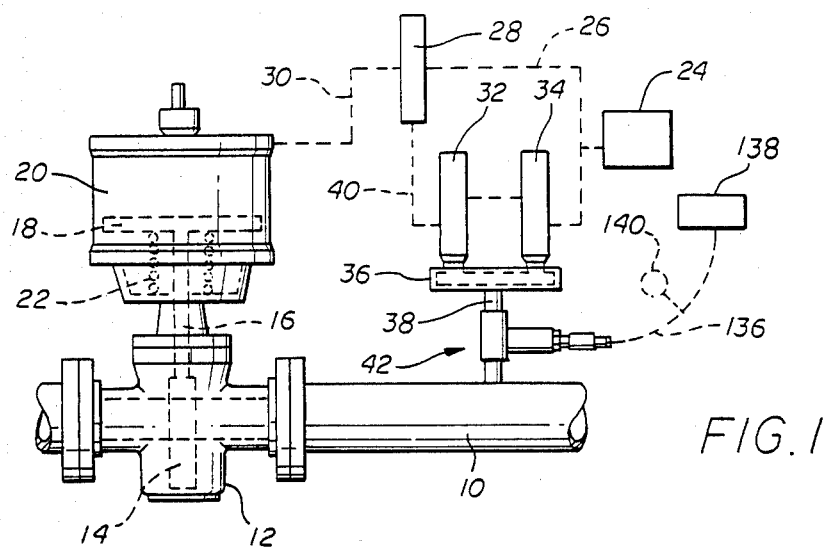
FIG. 1 is a schematic drawing illustrating one arrangement in which the present invention may be employed in a system to control the opening and closing of a gate valve in a main flow passage.

Referring now to the drawings in more detail and initially to FIG. 1 in which the test valve of the present invention is shown arranged in a safety system for closing a valve, a conduit 10 is shown having a main flow passage therein for a primary or first fluid pressure source. A gate valve shown at 12 has a gate valve memeber 14 therein positioned for movement between open and closed positions relative to the flow passage of conduit 10. A stem 16 has its lower end connected to gate member 14 and its upper end connected to a piston 18 mounted within a cylinder 20. A spring 22 continuously urges piston 18 toward the closed position of the gate valve member 14. A reservoir 24 supplies fluid through line 26, a by-pass valve 28, and line 30 to cylinder 20 to move piston 18 to an open position of gate valve member 14.

The control valves to be tested comprise a low pressure control valve 32 and a high pressure control valve 34 which are mounted on a base or manifold 36. Flowline pressure is transmitted from conduit 10 through line 38 to manifold 36 in fluid communication with low pressure control valve 32 and high pressure control valve 34. Low pressure and high pressure control valves 32 and 34 are normally in an open position and in this position fluid is supplied from reservoir 24 to cylinder 20 to maintain piston 18 in the down position as shown in FIG. 1. Low pressure control valve 32 and high pressure control valve 34 are maintained in open position in a fluid pressure range which may be predetermined. Upon the reaching of a predetermined low pressure, low pressure control valve 32 will move to a closed position to exhaust the fluid to atmosphere from line 40 leading to by-pass valve 28 which results in the bleeding of fluid pressure from cylinder 20 to permit gate valve member 14 to move to a closed position under the bias of spring 22. Likewise, when a predetermined high fluid pressure is reached in conduit 10, high pressure control valve 34 moves to a closed position to exhaust the fluid to atmosphere resulting in the movement of gate valve member 14 to a closed position. For further details of the operation of control valves 32 and 34, reference is made to U.S. Pat. No. 3,043,331, the entire disclosure of which is incorporated by this reference.

Periodically, it is necessary to check the low pressure control valve 32 to determine if the control valve will move to a closed position upon the reaching of a predetermined low pressure. Likewise, it is necessary periodically to test the high pressure control valve 34 to determine if control valve 34 will move to a closed position upon the reaching of a certain predetermined high fluid pressure. Therefore, in accordance with the present invention and referring particularly to FIGS. 2-4, a test valve structure indicated generally by numeral 42 is connected in line 38 for testing the low and high control valves 32 and 34. The test valve structure 42 includes a body 44 having an inlet flowline passage 46 with a female autoclave receptacle 48 therein in communication with the fluid pressure in conduit 10 to provide a first fluid pressure source. An outlet passage 50 with a female autoclave receptacle 52 is provided at an outlet end of body 44 and a valve chamber 54 is arranged between inlet passage 46 and outlet passage 50. A valve seat 56 is provided in valve chamber 54. Outlet passage 50 leads to manifold 36 to communicate fluid pressure from conduit 10 to both control valves 32 and 34.

Body 44 has an internally threaded opening 58 and an elongated housing 60 has an externally threaded end 62 which is threaded within internal threaded opening 58. An annular sealing member 64 seals between housing 60 and body 44 which is securely held in place by locknut 66. Housing 60 has a central bore therethrough generally indicated at 68 forming an enlarged diameter outer bore portion 70 and a restricted diameter inner bore portion 72. The inner end of the housing 60 has a plurality of passages 74 circumferentially located about the inner bore portion 72 in fluid communication between the valve chamber 54 and the outer bore portion 70. The outer end of the central bore 68 is threaded internally at 76. Fitting within bore 68 is a piston generally indicated at 78 having an inner end portion 80, an outer end portion 82 of a large diameter than the inner end portion 80, connected by an intermediate radial flange portion 84 of an enlarged diameter. The radial flange 84 closely fits within the enlarged outer bore portion 70 of the housing 60, and an annular sealing member 86 seals between flange 84 and bore portion 70. The enlarged diameter portion of the flange 84 has a plurality of circumferentially spaced ports 88 extending therethrough in fluid communication between the inner and outer sides of the radial flange 84. The inner end portion 80 of piston 78 is closely received through the bore portion 72 and a valve member 90 is provided on the innermost end of end portion 80. A spring 92 is positioned within the outer bore portion 70 and acts against flange 84 to continuously urge piston 78 and valve member 90 to an unseated position as shown in FIGS. 3 and 4.

Figure 3:
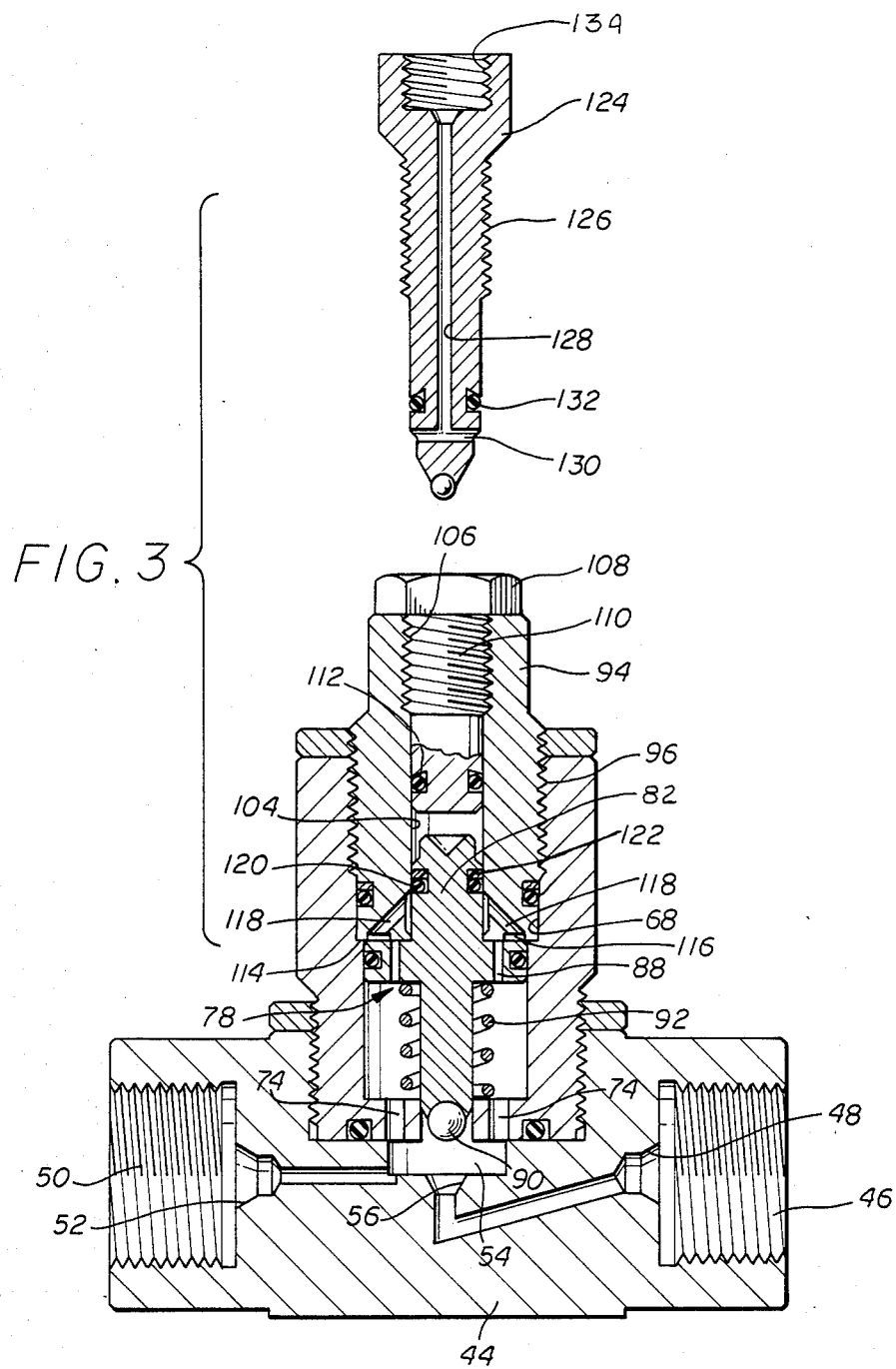
FIG. 3 is an enlarged sectional view similar to FIG. 2 but showing the stinger for inserting the test fluid removed from the test valve structure with an end cap positioned in the test valve housing in place of the stinger.

As shown in FIG. 3, with test valve 42 shown in its normal unactuated position without the source of any alternate test fluid connected thereto, a generally cylindrical plug indicated at 94 has external screw threads 96 engaging internal screw threads 76 of housing 60. An annular sealing member 98 and a backup ring 100 seals between plug 94 and housing 60 and a lock nut ring 102 firmly holds plug 94 in contact with the housing 60. Plug 94 has an axial bore 104 therein and internal screw threads 106 adjacent its outer end. An end cap 108 having external screw threads 110 is threaded within axial bore 104 and an annular sealing member 112 surrounding the cap 108 provides a seal preventing internal fluid from escaping the axial bore 104 to the outside atmosphere.

Figure 4:
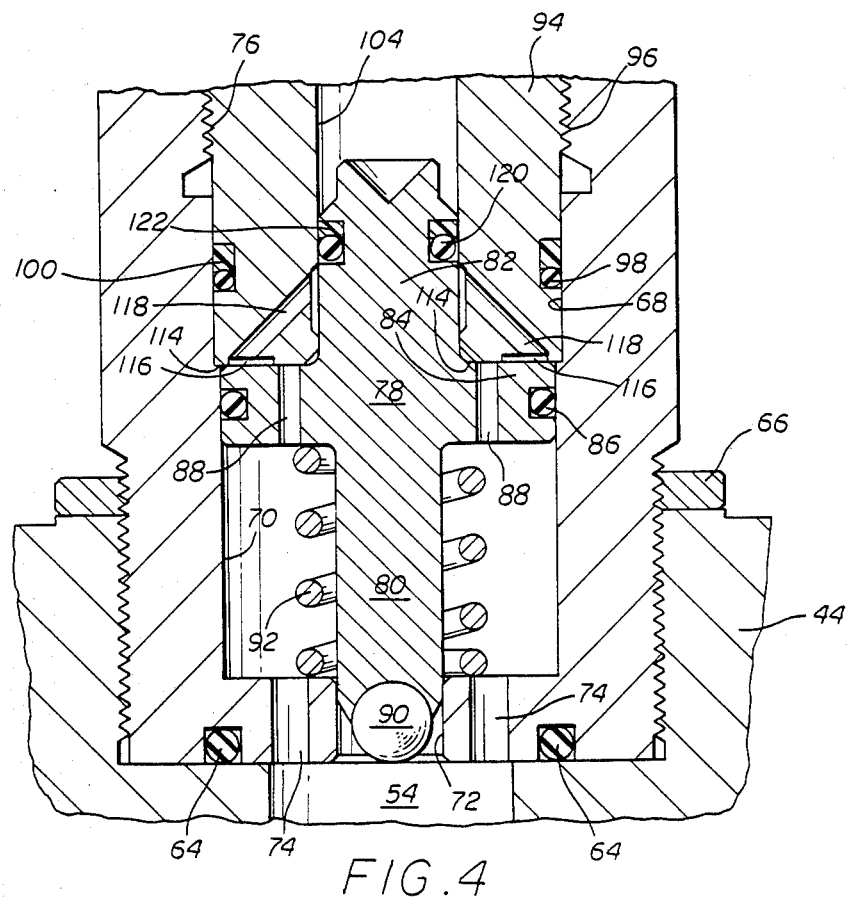
FIG. 4 is an enlarged sectional view of the piston and plug assemblies as shown in FIG. 3 showing the details of the dual sealing means closing off fluid communication from the first fluid pressure source to the alternate fluid passage.

As shown in greater detail in FIG. 4, the plug 94 further includes a bottom planar surface 114 having a circumferential groove 116 formed therein intermediately between the axial bore 104 and the outer perimeter of the plug 94. A plurality of conduits 118 in the plug 94 communicate between the groove 110 and the axial bore 104. The outer end portion 82 of the piston 78 is closely received within the axial bore 104 of the plug 94. When the piston 78 is in its unseated or unactivated position, a metal-to-metal primary or first seal is provided between the outer surface of the radial flange 84 of the piston and the the bottom planar surface 114 of the plug 94 blocking fluid communication between the ports 88 of the piston 78 and the conduits 118 or axial bore 104 of the plug 94. This primary seal prevents fluid from the first fluid pressure source from leaking into the alternate fluid passage outwardly of the flange 84.

The outer portion 82 of the piston 78 includes an annular sealing memeber 120 and backup ring 122 about its circumference and adjacent its outer end. When the piston 78 is in its unseated position the annular sealing member 120 is positioned in the axial bore 104 outwardly of the conduits 118 which open into the bore 104 providing a secondary seal between the piston 78 and plug 94. This secondary seal acts as a backup to the primary metal-to-metal seal and prevents fluid from leaking into the alternate fluid passage outwardly of the outer end of the piston 78.

Figure 2:
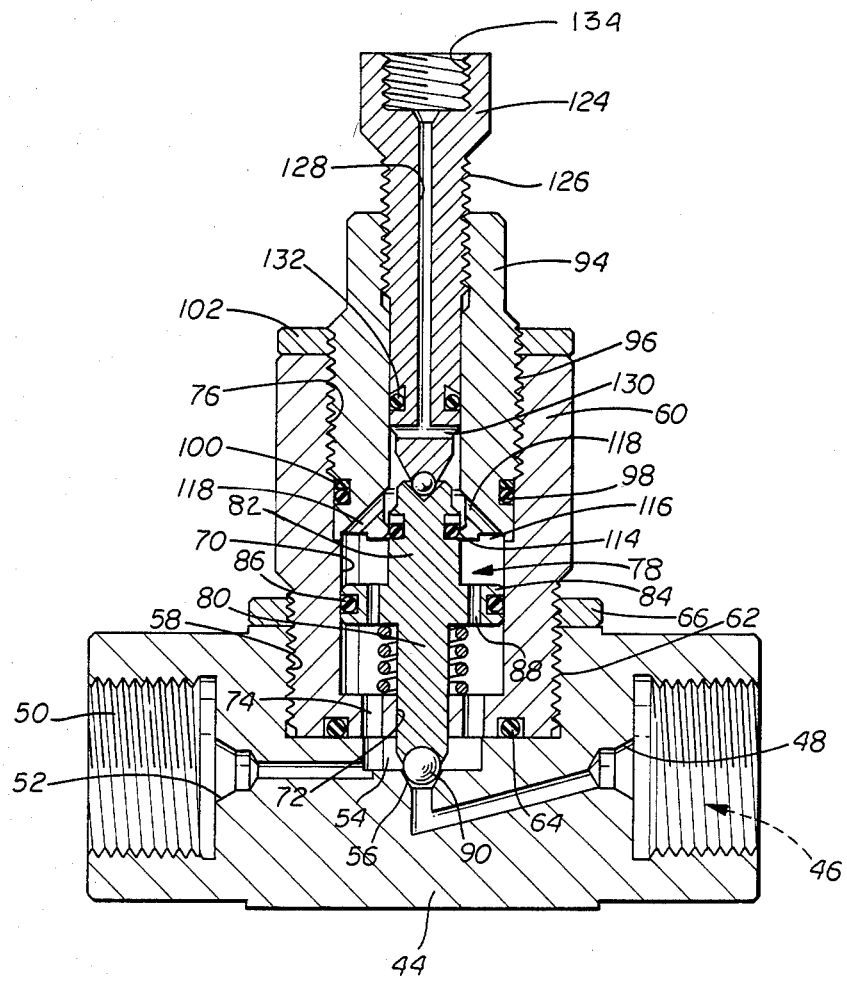
FIG. 2 is an enlarged sectional view of the test valve shown in FIG. 1 removed from the system and having the detachable stinger connected thereto engaging the piston into its sealed position blocking fluid communication from the first fluid pressure source to permit the application of a test fluid into the system for testing the control valves.

In the event it is desired to test control valves 32 and 34, end cap 108 is removed from plug 94 and a stinger indicated generally at 124 having an externally threaded portion 126 is received therein and engages the outer end surface of piston 78 as shown in FIG. 2. Stinger 124 has a central bore 120 therein and a laterally extending discharge port 130 communicating with central bore 128. The central bore 128 is internally threaded at its outer end as shown at 134 for connection with an alternate fluid source for testing the control valves.

A suitable flexible hose indicated diagrammatically at 136 in FIG. 1 is connected to the outer end of stinger 124 and extends to a reservoir 138 providing the alternate fluid pressure source for testing the control valves. A guage 140 may be provided in hose 136 to gauge the pressure therein for determining the required pressure to close low and/or high control valves 32 and 34, respectively, during testing.

OPERATION OF PREFERRED EMBODIMENT

In operation, with the test valve as shown in FIG. 3, end cap 108 is first removed, then stinger 124 is inserted within the axial bore 104 of plug 94 and threaded into contact with piston 78 to move piston 78 to the position of FIG. 2 in which valve member 90 is seated on valve seat 56 to block the flow of fluid from the first fluid pressure source. In this position, a flexible hose 136 is attached to stinger 124 and the test fluid is supplied from reservoir 138 through central bore 128 and lateral discharge ports 130 of stinger 124 into the axial bore 104 and through conduits 118 of plug 94. The test fluid continues on into the outer bore portion 70 through ports 88 of piston 78 and passages 74 of housing 60 into valve chamber 54 and outlet flow passage 50. When valve member 90 is seated on seat 56, the metal-to-metal primary seal is open and secondary seal 120 is positioned below the openings of conduit 118 in the axial bore 104 of plug 94 so that test fluid may be easily supplied to outlet flow passage 50 for communicating with control valves 32 and 34 for testing thereof. A predetermined low pressure may be provided by checking gauge 140 and thus low pressure control valve 32 may be actuated. A predetermined high pressure may also be provided by fluid pressure reservoir 138 to test high pressure control valve 34.

After control valves 32 and 34 have been checked, stinger 124 is unthreaded from plug 94 and piston 78 returns to the position shown in FIGS. 3 and 4 under the bias of spring 92 and the force of pressurized fluid from the first fluid pressure source once the valve member 90 becomes unseated from the valve seat 56. The diameter of the outer end portion 82 of piston 78 is purposefully larger than the diameter of the inner end portion 80 of piston 78 so as to maximize the surface area existing under flange 84 relative to that above flange 84 so as to enable the use of the first fluid pressure source to further urge piston 78 to return to its unseated position. In this position, the outer surface of flange 84 contacts the bottom surface 114 of plug 94 providing a metal-to-metal primary seal to block fluid communcation through the ports 88 of piston 78. The annular sealing member 120 is in sealing contact with the adjacent surface formed by axial bore 104 outwardly of conduits 118 providing a secondary seal so that the first fluid pressure source from inlet 46 is sealed from the axial bore 104 of plug 94. The metal-to-metal primary seal provides the major sealing force thereby protecting the annular sealing member 120 from experiencing the full working pressure of the first fluid pressure source and, thus, providing a test valve that is capable of withstanding high working pressures without leaking. After stinger 124 has been removed, end cap 108 may again be threaded within plug 94 as shown in FIG. 3.

A serviceman normally moves from one safety system to another and stinger 124 along with reservoir 138 and hose 136 are portable so that the servicemen may quickly go to the different systems for testing. Thus, upon removal of stinger 124, piston 78 is automatically returned to the unseated position and the piston immediately provides a dual sealing means preventing the escape of pressurized fluid from the first fluid pressure source to the exterior of the test valve.

What is claimed is:

1. A test valve structure for closing a first fluid pressure source acting on a valve means and communicating an alternate fluid pressure source to act on the valve means for testing the valve means comprising;
   a. a test valve for positioning between the first fluid pressure source and the valve means to be tested, said test valve including a body having fluid inlet and outlet passageways communicating with a valve chamber having a valve seat therein;
   b. an elongated housing secured to said body and having a central bore therein in fluid communication with the valve chamber, the central bore having an enlarged diameter outer bore portion adjacent a restricted diameter inner bore portion relative to and communicating directly with the valve chamber, said housing having a bottom portion bordering the valve chamber with a plurality of passages circumferentially located about the inner bore portion in fluid communication between the valve chamber and the outer bore portion of the central bore;
   c. a piston mounted within the central bore of said housing having inner and outer end portions relative to the valve chamber connected by an intermediate radial flange of an enlarged diameter, the radial flange fitting closely within the enlarged outer bore portion of said housing and having a plurality of circumferentially spaced ports extending through the enlarged portion of the flange with longitudinal axes running generally parallel with the longitudinal axis of the central bore, the inner end portion of said piston fitting closely within the restricted diameter inner bore portion of said housing and having a valve member on its innermost end extending within the valve chamber of said body, said piston being movable between a projected seated position of the valve member on the valve seat within the valve chamber to block fluid flow between the inlet and outlet passageways and a retracted unseated position of the valve member permitting fluid flow between the inlet and outlet passageways;
   d. an annular plug mounted within the central bore of said housing outwardly of said piston with respect to the valve chamber having an axial bore extending therethrough and an inwardly bottom planar surface extending radially of the axial bore with a circumferential groove formed therein intermediately between the axial bore and an outer perimeter of said plug, said plug having a plurality of conduits in fluid communication between the axial bore and the circumferential groove, the axial bore receiving the outer end portion of said piston for movement between the seated and unseated positions of the valve member of said piston;
   e. a spring mounted within the outer bore portion of said housing and urging said piston continuously into the retracted unseated position of the valve member so that the flow of fluid is maintained between the inlet and outlet passageways through the valve chamber, the radial flange of said piston contacting the bottom planar surface of said plug and forming a metal-to-metal primary seal such that fluid communication is blocked between the ports of said piston and the circumferential groove of said plug to close off fluid communication to the alternate fluid pressure source from the first fluid pressure source, said piston being movable to a seated position of the valve member breaking the primary seal between the radial flange of said piston and the bottom planar surface of said plug such that fluid communication is opened between the circumferential groove of said plug and the ports of said piston to allow fluid communication from the alternate fluid pressure source to the valve means to be tested; and
   f. an annular sealing means about the outer end portion of said piston adjacent its outermost end providing a secondary seal between said piston and the axial bore of said plug such that when said piston is in its retracted position said annular sealing means is positioned outwardly of the conduit openings in the axial bore to block fluid communication between the conduits and the axial bore of said plug outwardly of said annular sealing means, said annular sealing means being positioned inwardly of the conduit openings in the axial bore when the valve member is seated in the seated position of the valve member to allow fluid communication between the axial bore and the conduits of said plug for testing of the valve means.

2. A test valve structure as set forth in claim 1 wherein said annular sealing member is an elastomeric O-ring which fits in a groove about the circumference of the outer end portion of said piston.

3. A test valve structure as set forth in claim 2 wherein the diameter of the inner end portion of said piston is smaller than the diameter of the outer end portion of said piston providing a larger surface area on the inner side of the radial flange than on the outer side of the radial flange of said piston so that the pressurized fluid existing in the first fluid pressure source acts to urge and hold said piston in its retracted position.

4. A test valve structure as set forth in claim 3 further comprising an end cap threadably received in an outer end of said plug upon completion of the testing of the valve means to provide a closure for the alternate fluid passage so that fluid contained in the alternate fluid passage will not leak into the outside atmosphere.

* * * * *